(12) United States Patent
Walters

(10) Patent No.: US 6,959,861 B1
(45) Date of Patent: Nov. 1, 2005

(54) METHOD OF AGE VERIFICATION FOR ELECTRONIC MEDIA

(75) Inventor: Lawrence G. Walters, Altamonte Springs, FL (US)

(73) Assignee: Metro Innovations, Inc., Altamonte Springs, FL (US)

( * ) Notice: Subject to any disclaimer, the term of this patent is extended or adjusted under 35 U.S.C. 154(b) by 0 days.

(21) Appl. No.: 10/724,755

(22) Filed: Dec. 2, 2003

(51) Int. Cl.[7] .............................................. G06K 5/00
(52) U.S. Cl. ........................ 235/380; 235/381; 235/382
(58) Field of Search ................................ 235/380–382, 235/485–487; 705/75, 67, 26, 65; 713/182

(56) References Cited

U.S. PATENT DOCUMENTS

| | | | |
|---|---|---|---|
| 6,196,460 B1 * | 3/2001 | Shin ............................. | 235/380 |
| 6,508,709 B1 * | 1/2003 | Karmarkar ..................... | 463/42 |
| 6,523,741 B1 * | 2/2003 | DiMaria et al. ............. | 235/375 |
| 6,679,425 B1 * | 1/2004 | Sheppard et al. ............ | 235/382 |
| 6,704,787 B1 * | 3/2004 | Umbreit ....................... | 709/229 |
| 6,755,344 B1 * | 6/2004 | Mollett et al. ............... | 235/383 |
| 6,854,642 B2 * | 2/2005 | Metcalf et al. .............. | 235/375 |
| 2001/0051996 A1 * | 12/2001 | Cooper et al. ............... | 709/217 |
| 2002/0019828 A1 * | 2/2002 | Mortl ........................... | 707/200 |
| 2002/0056049 A1 | 5/2002 | Vinati et al. | |
| 2002/0133708 A1 * | 9/2002 | Gudorf et al. ............... | 713/186 |
| 2002/0162031 A1 | 10/2002 | Levin et al. | |
| 2002/0196125 A1 | 12/2002 | Yu et al. | |
| 2003/0004880 A1 | 1/2003 | Banerjee et al. | |
| 2003/0036926 A1 | 2/2003 | Starkey et al. | |
| 2003/0069741 A1 | 4/2003 | Hoyer et al. | |
| 2003/0177102 A1 * | 9/2003 | Robinson ...................... | 705/75 |

* cited by examiner

Primary Examiner—Karl D. Frech
Assistant Examiner—Edwyn Labaze
(74) Attorney, Agent, or Firm—Paul S. Rooy, P.A.

(57) ABSTRACT

A method of age verification for electronic media. The method includes the step of displaying a gateway page containing one or more of the following: a warning, user age limitation, terms and conditions, completion instructions, sworn statement, E-Sign Act statement, date of birth block, signature block, and activation button. User age and name are entered in the date of birth block and signature block. Upon clicking the activation button, software associated with the gateway page calculates each user's age by determining the difference between the current date and the user's date of birth. If the user's age thus calculated equals or exceeds a threshold age, access to the site is provided. If the user's name does not meet or exceed the threshold age, access to the site is denied. Names, dates of birth, times and dates of attempted access, and IP addresses may be stored in an access attempts record.

25 Claims, 4 Drawing Sheets

Fig. 1

WARNING! THIS SITE CONTAINS ADULT MATERIALS.

YOU MUST BE AN ADULT (18 OR 21 YEARS OLD, DEPENDING ON YOUR JURISDICTION) TO ENTER THIS WEB SITE.

All images displayed on this site comply with 15 U.S.C. Sect. 2257. By entering this website and/or submitting the information below, you agree to all of this site's Terms & Conditions. [Terms & Conditions]

To enter our free areas, you must certify, under the penalties of perjury, your date of birth in the following Birth Date Verifier form:

"I hereby affirm, under the penalties of perjury pursuant to 28 U.S.C. Sect. 1746, that I was born on the following month, day, and year:"

Month  Day  Year
[  ▶]  [  ▶]  [  ▶]

"I also agree that this transaction is governed by the Electronic Signatures in Global and National Commerce Act (E-Sign Act) and related state law. Providing a false declaration under the penalties of perjury is a criminal offense. This document constitutes an un-sworn declaration under federal law. You may submit a paper copy of this transaction and print this form for your personal records. You have the right to withdraw your consent to use the E-Sign Act by e-mailing us. Your consent to use the E-Sign Act is limited to providing the information on this form. Access to this electronic record requires a simple browser program such as Internet Explorer TM or Netscape TM and a computer.

[                    ]
Signed:
Type your name.

[Click here to submit your electronic signature.]

Access by minors is strictly forbidden. If you are a minor, or do not wish to view adult materials, click [here]

Fig. 2

WARNING! THIS SITE CONTAINS ADULT MATERIALS.

YOU MUST BE AN ADULT (18 OR 21 YEARS OLD, DEPENDING ON YOUR JURISDICTION) TO ENTER THIS WEB SITE.

All images displayed on this site comply with 15 U.S.C. Sect. 2257. By entering this website and/or submitting the information below, you agree to all of this site's Terms & Conditions. [ Terms & Conditions ]

To enter our free areas, you must certify, under the penalties of perjury, your date of birth in the following Birth Date Verifier form:

"I hereby affirm, under the penalties of perjury pursuant to 28 U.S.C. Sect. 1746, that I was born on the following month, day, and year:"

Month [ 12 ▼ ]   Day [ 12 ▼ ]   Year [ 1969 ▼ ]

"I also agree that this transaction is governed by the Electronic Signatures in Global and National Commerce Act (E-Sign Act), 15 U.S.C. Sect. 7000, et seq"

Note: This information is provided in an effort to comply with the Child Online Protection Act (COPA) and related state law. Providing a false declaration under the penalties of perjury is a criminal offense. This document constitutes an un-sworn declaration under federal law. You may submit a paper copy of this transaction and print this form for your personal records. You have the right to withdraw your consent to use the E-Sign Act by e-mailing us. Your consent to use the E-Sign Act is limited to providing the information on this form. Access to this electronic record requires a simple browser program such as Internet Explorer TM or Netscape TM and a computer.

Signed: [ John P. Smith ]
Type your name.

[ Click here to submit your electronic signature. ]

Access by minors is strictly forbidden. If you are a minor, or do not wish to view adult materials, click [ here ]

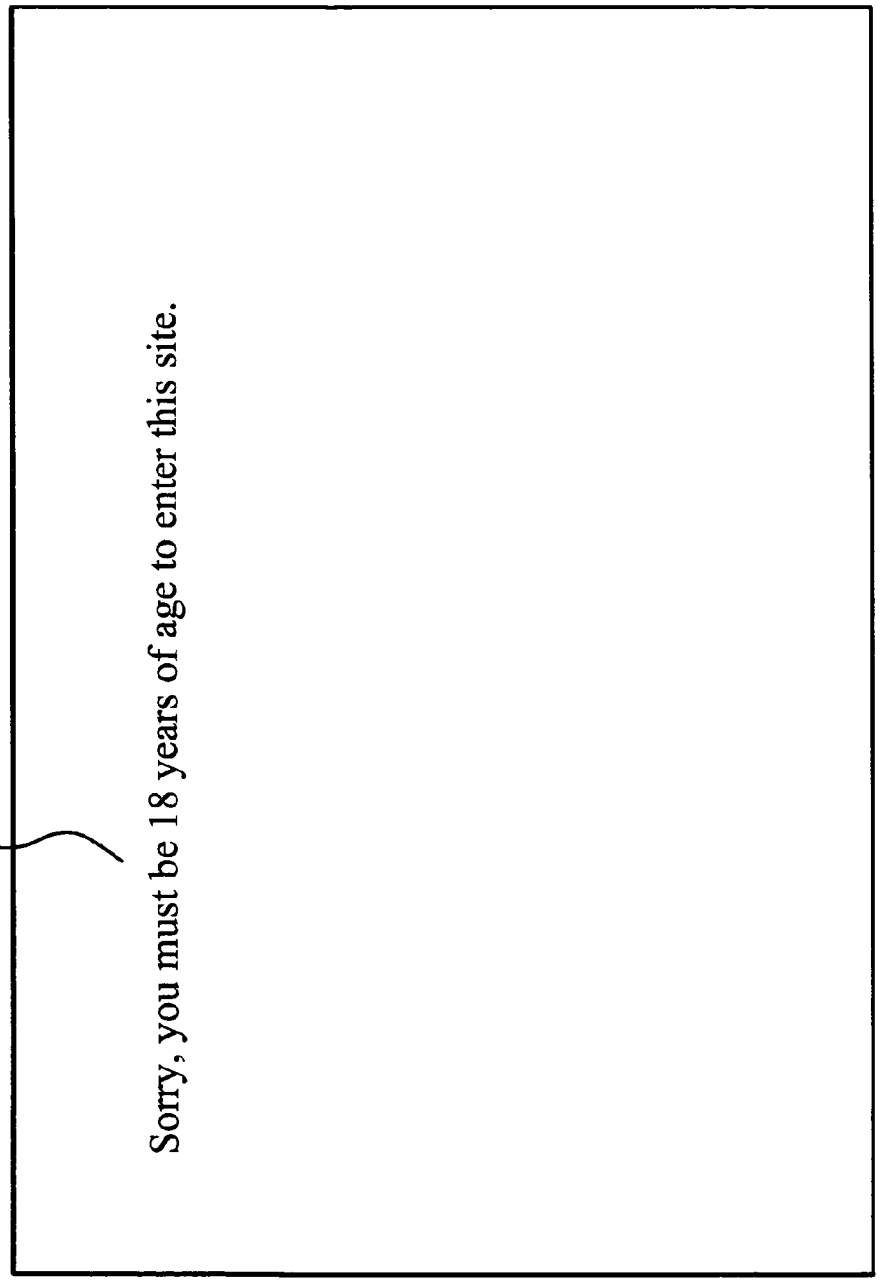

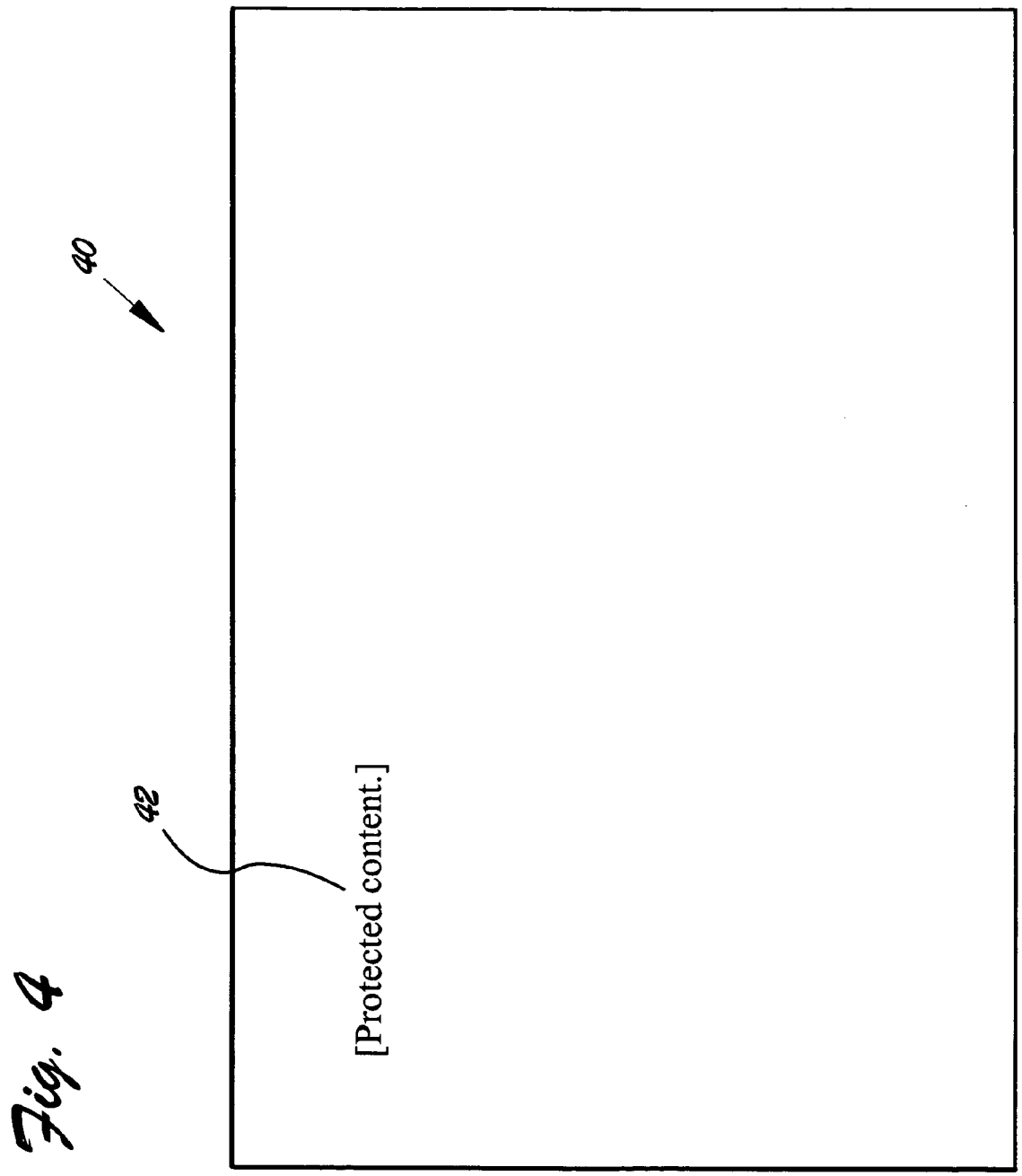

METHOD OF AGE VERIFICATION FOR ELECTRONIC MEDIA

BACKGROUND OF THE INVENTION

1. Field of the Invention

This invention relates to age verifiers, and in particular to method of age verification for electronic media.

2. Background of the Invention

A variety of internet web sites exist which are not appropriate for access by children. These may include gambling sites, chat rooms whose subject(s) are not appropriate for children, adult sites, etc. Many believe it is primarily the responsibility of the parent or guardian to monitor the type of web sites and television a minor is exposed to. However, it would be desirable to provide an additional mechanism to prevent minors from accessing inappropriate web sites.

A variety of age verification systems have been used, such as credit card-based membership subscriptions, age verification system ("AVS") firewalls, and the now discredited "I'm over 18, let me in" button. Although the Child Online Protection Act ("COPA") (at last notice declared unconstitutional on First Amendment grounds) creates a "safe harbor" under which webmasters can rely upon the AVS or credit card solution as a defense to any claim that they are providing harmful materials to minors, no court has recognized the legal validity of a simple click-through screen where the user asserts that he or she is an adult.

There are a number of problems associated with these proposed age verification mechanisms. First, while implementation of credit card or AVS screens to block material that is harmful to minors may be somewhat effective, its consequential effects do not pass constitutional muster. Initially, users may be less likely to access protected speech if they are required to provide personal information, including names, addresses and credit card numbers. The Third Circuit Court of Appeals specifically found that Web users are simply unwilling to provide personal information in order to gain access to sensitive or controversial content.

Secondly, a distinct set of constitutional concerns are presented where individuals are required to pay even small amounts of money for access to protected communications. Finally, aside from the constitutional concerns, many credit card issuers object to the use of their credit cards for age verification purposes. Thus, given the substantial lobbying power of the merchant banks, it is anticipated that any new legislation proposed by Congress will likely not include the credit card option as an acceptable method of age verification.

Despite the fact that COPA has been enjoined on multiple occasions, it is still advisable for adult webmasters to comply with the dictates of this law. First, the government has never promised that it will not attempt to retroactively prosecute those who are not in compliance, if the law is ultimately upheld by the United States Supreme Court. Secondly, it is simply the right thing to do to keep minors from accessing adult materials from a legal and moral standpoint.

Importantly, a number of states have passed laws prohibiting businesses from providing adult materials to minors, and many of these laws appear to apply to online communications. Although some such laws have been declared unconstitutional, there is no guarantee that a criminal case won't be filed against an adult webmaster that is providing adult materials to minors without any form of age verification. Furthermore, although the issue of harmful materials is completely distinct from that of obscenity, obscenity cases become much harder to defend if the government can show that the allegedly obscene materials were also available to minors.

So what is a webmaster to do? To start out with, it should be noted that the COPA law recognizes several "affirmative defenses" to prosecution for providing harmful materials to minors. COPA's affirmative defense provision reads as follows:

Defense. It is an affirmative defense to prosecution under this section that the defendant, in good faith, has restricted access by minors to material that is harmful to minors—
(A) by requiring use of a credit card, debit account, adult access code, or adult personal identification number;
(B) by accepting a digital certificate that verifies age; or
(C) by any other reasonable measures that are feasible under available technology. [Emphasis added.]

It is the third COPA affirmative defense that forms part of the inspiration for the instant invention. Similarly, may states' laws provide a defense to this type of charge if the business uses "good faith efforts" to keep adult materials away from minors, such as placing adult magazines behind a store clerk's counter, out of reach of children, and blocking the front covers.

So what are acceptable "good faith" efforts to verify age without requiring personal identification and/or credit card payments? A solution embodied in the instant invention utilizes both the Unsworn Declarations Act, 28 U.S.C. §1746, and the Electronic Signatures Act, 15 U.S.C. § 7000, et seq., to allow the user to certify his or her date of birth and to provide that information under penalty of perjury, before gaining access to inappropriate materials.

The mechanism taught in the instant disclosure automatically checks the current date on the server, to determine if the individual user is over the minimum appropriate age on that date, based on the birth date provided under penalties of perjury. If yes, the user can gain access to the free areas of the web site, without becoming a member, paying any money, or providing credit card information. The effectiveness of the instant procedure depends on the use of the specific verified declaration language under federal law, and reference to the Electronic Signatures Act, allowing the user to provide a statement made subject to the penalties of perjury before gaining access to the site.

From a legal standpoint, this procedure is superior compared to simply clicking "I'm over 18" which has become something of a national joke in the courts, and will likely not provide an effective argument that the site has made a good faith effort to exclude minors from the free areas. Requiring the user to verify his or her birth date accomplishes a number of things. First, in the event a minor submits a false birth date to gain access to the site, such misrepresentation will constitute an act of perjury, under federal law. The courts are less sympathetic to the claims of minors who commit felonies to obtain access to adult materials. When weighing the relative equities between a webmaster attempting to exclude minors, and a minor committing perjury, it is hoped that the courts will be more sympathetic to the former.

This situation is akin to the store clerk who is provided a fake driver's license by a minor in the attempt to purchase tobacco products. However, in this case, the information is being provided under oath.

A second advantage of the instant mechanism is the fact that, other than the birth date, no identifying information is being sought from the user. Some users may wish to remain anonymous, and these users will not be significantly deterred by providing a birth date, especially when the user's corresponding address or credit card number is not also required. This solution may address the constitutional concerns noted by the Third Circuit Court of Appeal where users are required to pay or provide personal identifying information before gaining access to adult materials.

COPYRIGHTS AND DISCLAIMERS

The birth check language age and computer script taught herein are both subject to copyright protection. All rights are reserved, and no use whatsoever thereof is permitted without the permission of the copyright owner. The instant mechanism is an innovative solution, which has not been tested in the courts. Therefore, it is uncertain how any particular court will react to the instant mechanism.

SUMMARY OF THE INVENTION

Accordingly, it is an object of the present invention to provide a method of age verification for electronic media which has the effect of allowing the user to certify his or her date of birth and to provide that information under penalty of perjury, before gaining access to inappropriate materials. Design steps allowing this object to be accomplished include displaying a penalty statement and an E-Sign Act statement on a gateway page on a user's computer, entering the user's date of birth in a date of birth block on the gateway page, and entering the user's name in a signature block on the gateway page. Advantages associated with the accomplishment of this object include greater certainty of a user's age prior to granting the user access to a protected site, and reduced likelihood that inappropriately aged users will gain access to the site.

It is another object of the present invention to provide a method of age verification for electronic media which provides for user acceptance of site terms and conditions at the same time that the user provides his or her name and date of birth. Design steps allowing this object to be accomplished include displaying a terms and conditions statement and a terms and conditions link on the gateway page on a user's computer. Benefits associated with the accomplishment of this object include increased efficiency in the use of a user's time, and increased likelihood that a user will progress to the protected pages of the site.

It is still another object of this invention to provide a method of age verification for electronic media which permits a prospective user to voluntarily leave the gateway page. Design features enabling the accomplishment of this object include an exit button on the gateway page. An advantage associated with the realization of this object is increased user convenience, and greater likelihood that inappropriately aged users will not gain access to a protected site.

It is yet another object of this invention to provide a method of age verification for electronic media which provides a means to preserve a record of attempted accesses. A design feature enabling the accomplishment of this object includes the step of storing in memory an access attempts record containing prospective users' names, dates of birth, times and dates of attempted access, and the IP addresses from which access was attempted. Advantages associated with the realization of this object include the ability to preserve important evidence bearing on ages and identities of prospective user seeking access, in order to help refute allegations that inappropriately aged individuals gained access.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIG. 2. Sheet three contains FIG. 3. Sheet four contains FIG. 4.

FIG. 1 is a front view of a blank gateway page.

FIG. 2 is a front view of a gateway page with date of birth and signature blocks completed.

FIG. 3 is a front view of an access denied page.

FIG. 4 is a front view of an access approved page.

DETAILED DESCRIPTION OF THE PREFERRED EMBODIMENT

FIG. 1 is a front view of a blank gateway page 2, which the instant invention teaches appears on a user's computer screen when the user desires to gain access to an internet web site protected by gateway page 2. Gateway page 2 may comprise one or more of the following: warning 4, age limitation statement 6, terms and conditions statement 7, link to terms and conditions 9, completion instructions 8, penalty statement 10, E-Sign Act statement 12, date of birth block 14, signature block 16, activation button 18, and exit button 20.

Warning 4 provides notice to prospective users that materials on the site may not be appropriate for all ages, and age limitation statement 6 specifies the required minimum age for entry. Completion instructions 8 advise users that they must certify their date of birth under penalty of perjury to enter the site.

Terms and conditions statement 7 specifies that each prospective user agrees to the site terms and conditions by entering the site. Thus, at the same time that each user provides date of birth 15 and name 17 information, each user also agrees to the site terms and conditions. This consolidation of steps saves user time, while ensuring that each user entering the site has agreed to the site terms and conditions. Terms and conditions link 9 provides access to the site terms and conditions for the users' reference.

Penalty statement 10 must be agreed to by users wishing to access the site, and specifies that the birth date affirmation made by the subscribing user is made under penalty of perjury. Each user must also agree to E-Sign Act Statement 12, which provides that the instant age verification method is governed by the Electronic Signatures in Global and National Commerce Act. This utilization of both the Unsworn Declarations Act, 28 U.S.C. §1746, and the Electronic Signatures Act, 15 U.S.C. § 7000, et seq. has the effect of allowing the user to certify his or her date of birth and to provide that information under penalty of perjury, before gaining access to inappropriate materials.

Each potential site user is required to type his or her date of birth 15 into date of birth block 14, and his or her name 17 into signature block 16 as illustrated in FIG. 2, and then click on activation button 18 for access to the site. Software associated with gateway page 2 then 11 calculates the prospective user's age by determining the difference between the current date and the user's date of birth.

If the calculated age does not equal or exceed the threshold age required to access the site, an access denied page 30 will appear, with an associated access denied message 32, as depicted in FIG. 3. Typical threshold ages may be 18 years old, 21 years old, etc.

If the calculated age equals or exceeds the threshold age required to access the site, protected inner page 40 will appear, with associated protected content 42, as depicted in FIG. 4.

Exit button 20 permits a prospective user to voluntarily leave the gateway page, by clicking on exit button 20. Exit button 20 increases user convenience and the likelihood that inappropriately aged users will not gain access to a protected site.

The software associated with gateway page 2 stores in memory an access attempts record containing data including the time, date, name 17, date of birth 15 and IP address of every access attempt made. This data contained in the access attempts record could provide important evidence bearing on the identity, and thus age, of every prospective user seeking access.

For instance, if allegations are made that inappropriately aged individuals are accessing a certain site, the access attempts record could be referred to in order to determine the name 17, asserted date of birth 15, and IP address of an individual alleged to be of inappropriate age. The access attempts record would also provide the times and dates of attempted access by such individual. If it turns out the individual is a 45 year old male, who was located at the physical IP address at the time of the incident(s), such data could provide valuable evidence that no inappropriately aged individual passed through gateway page 2 at the time(s) alleged.

Thus, the instant method comprises the following steps:
A. Displaying a gateway page;
B. Displaying a terms and conditions statement on the gateway page;
C. Displaying completion instructions on the gateway page;
D. Displaying a penalty statement on the gateway page;
E. Displaying an E-Sign Act statement on the gateway page;
F. Entering a date of birth in a date of birth block on the gateway page;
G. Entering a name in a signature block on the gateway page;
H. Clicking on an activation button on the gateway page;
I. Calculating a prospective user's age by determining a difference between a current dat and the user's date of birth.

The instant method may include the further steps of displaying an access denied page if the calculated age does not equal or exceed a threshold age, or displaying a protected inner page of the calculated age equals or exceeds a threshold age.

The instant method may include the further steps of storing in memory an access attempts record containing data including the time, date, name 17, date of birth 15 and IP address of every access attempt made.

While a preferred embodiment of the invention has been illustrated herein, it is to be understood that changes and variations may be made by those skilled in the art without departing from the spirit of the appending claims.

DRAWING ITEM INDEX

2 gateway page
4 warning
6 age limitation statement
7 terms and conditions statement
8 completion instructions
9 terms and conditions ink
10 penalty statement
12 E-Sign Act statement
14 date of birth block
15 date of birth
16 signature block
17 name
18 activation button
20 exit button
30 access denied page
32 access denied message
40 protected inner page
42 protected content

I claim:

1. A method of age verification comprising the steps of:
   A. Displaying a gateway page;
   B. Displaying a penalty statement on said gateway page;
   C. Entering a user's date of birth in a date of birth block on said gateway page;
   D. Entering a user's name in a signature block on said gateway page;
   E. Clicking on an activation button; and
   F. Calculating a prospective user's age by determining a difference between a current date and said user's date of birth.

2. The method of age verification of claim 1 comprising the further step of displaying an E-Sign Act statement on said gateway page.

3. The method of age verification of claim 2 wherein said E-Sign Act statement comprises a statement that an Electronic Signatures in Global and National Commerce Act governs.

4. The method of age verification of claim 3 wherein said E-Sign Act statement references 15 U.S.C.

5. The method of age verification of claim 1 comprising the further step of displaying a terms and conditions statement on said gateway page.

6. The method of age verification of claim 5 wherein said terms and conditions statement comprises a statement that a user agrees to site terms and conditions.

7. The method of age verification of claim 6 wherein said gateway page further comprises a link to said site terms and conditions.

8. The method of age verification of claim 1 comprising the further step of displaying completion instructions on said gateway page.

9. The method of age verification of claim 1 wherein said penalty statement comprises a statement that said user's date of birth is provided subject to penalties of perjury.

10. The method of age verification of claim 9 wherein said penalty statement comprises a statement that said user's date of birth is provided subject to penalties of perjury pursuant to 28 U.S.C.

11. The method of age verification of claim 1 comprising the further step of displaying a protected inner page if said user's age meets or exceeds a threshold age.

12. The method of age verification of claim 1 comprising the further step of displaying an access denied page containing an access denied message if said user's age does not meet or exceed a threshold age.

13. The method of age verification of claim 1 comprising the further step of displaying an age limitation statement on said gateway page.

14. The method of age verification of claim 1 comprising the further step of storing in memory an access attempts record containing at least one prospective user's name, date of birth, and time and date of attempted access.

15. The method of age verification of claim 14 comprising the further step of storing in said access attempts record at least one IP address from which an access attempt has been made, whereby evidence bearing on an age of said prospective user seeking access may be preserved.

16. A method of age verification comprising the steps of:
A. Displaying a gateway page;
B. Displaying a penalty statement on said gateway page;
C. Displaying an E-Sign Act statement on said gateway page;
D. Entering a user's date of birth in a date of birth block on said gateway page;
E. Entering a user's name in a signature block on said gateway page;
F. Clicking on an activation button; and
G. Calculating a prospective user's age by determining a difference between a current date and said user's date of birth.

17. The method of age verification of claim 16 comprising the further step of displaying a protected inner page if said user's age meets or exceeds a threshold age.

18. The method of age verification of claim 16 comprising the further step of displaying an access denied page containing an access denied message if said user's age does not meet or exceed a threshold age.

19. The method of age verification of claim 16 comprising the further step of displaying a terms and conditions statement on said gateway page.

20. The method of age verification of claim 19 comprising the further step of displaying a warning and an age limitation statement on said gateway page.

21. The method of age verification of claim 20 comprising the further step of providing an exit button whereby a user may voluntarily leave said gateway page by clicking on said exit button.

22. The method of age verification of claim 16 comprising the further step of storing in memory an access attempts record containing at least one prospective user's name, date of birth, and time and date of attempted access.

23. The method of age verification of claim 22 comprising the further step of storing in said access attempts record at least one IP address from which an access attempt has been made, whereby evidence bearing on an age of said prospective user seeking access may be preserved.

24. A method of age verification comprising the steps of:
A. Displaying a gateway page;
B. Displaying a penalty statement on said gateway page;
C. Displaying an E-Sign Act statement on said gateway page;
D. Entering a user's date of birth in a date of birth block on said gateway page;
E. Entering a user's name in a signature block on said gateway page;
F. Clicking on an activation button;
G. Calculating a prospective user's age by determining a difference between a current date and said user's date of birth; and
H. Storing in memory an access attempts record containing at least one prospective user's name, date of birth, and time and date of attempted access.

25. The method of age verification of claim 24 comprising the further step of storing in said access attempts record at least one IP address from which an access attempt has been made, whereby evidence bearing on an age of said prospective user seeking access may be preserved.

\* \* \* \* \*

UNITED STATES PATENT AND TRADEMARK OFFICE
CERTIFICATE OF CORRECTION

PATENT NO. : 6,959,861 B1
DATED : November 1, 2005
INVENTOR(S) : Walters, Lawrence G.

It is certified that error appears in the above-identified patent and that said Letters Patent is hereby corrected as shown below:

Column 4,
Line 60, "page 2 then 11 calculates…" should be -- page 2 then calculates…".

Column 5,
Line 42, "between a current dat and…" should be -- between a current date and… --.

Signed and Sealed this

Tenth Day of January, 2006

JON W. DUDAS
*Director of the United States Patent and Trademark Office*